J. W. BURKETT.
CORN HUSKER.
APPLICATION FILED APR. 28, 1915.

1,329,752.

Patented Feb. 3, 1920.

3 SHEETS—SHEET 3.

Witnesses
R. M. McCormick
A. L. Phelps

Inventor
John W. Burkett
By
C. D. Shepherd Attorney

UNITED STATES PATENT OFFICE.

JOHN W. BURKETT, OF COLUMBUS, OHIO, ASSIGNOR TO THE BURKETT MANUFACTURING COMPANY, OF COLUMBUS, OHIO, A CORPORATION OF OHIO.

CORN-HUSKER.

1,329,752.  Specification of Letters Patent.  Patented Feb. 3, 1920.

Application filed April 28, 1915. Serial No. 24,445.

*To all whom it may concern:*

Be it known that I, JOHN W. BURKETT, a citizen of the United States, residing at Columbus, in the county of Franklin and State of Ohio, have invented certain new and useful Improvements in Corn-Huskers, of which the following is a specification.

My invention has relation to that type of farm machinery used for removing the husks from corn. Various endeavors have been made along this line both as regards the ear when attached to the stalk and removed from the stalk, but my invention differs essentially from these former endeavors in that the husks and stalk are left intact instead of being shredded or otherwise mutiliated.

The main object of my invention, therefore, resides in the production of a machine wherein the ear of corn may be removed from its position within the husk without mutilating or in any manner unnecessarily destroying the husk or stalk. My aim is also to provide a structure wherein the husk itself may be left on the stalk after the ear of corn has been removed.

A further object of my invention resides in the provision of a pair of snap rolls so arranged and so driven that the ear of corn is squeezed out from the husk, sufficient pressure being exerted to snap or drag its connecting stem.

A further object of my invention resides in a specific type of snap rolls wherein each roll is provided with a flat place to present a suitable space when the two flat faces are opposite each other, into which the stem of the ear of corn may be inserted. In this manner, a space is presented for readily receiving the corn stem, which space is subsequently reduced by continued rotation of the rolls to diminish it to such size that the ear will be snapped from its engagement with the stem.

Still a further object of my invention resides in the provision of a table structure provided with a slot into which the depending ear of corn is placed, the stalk itself being carried over the upper side of the table by any suitable means.

Another object of my invention resides in the provision of means whereby the ear while still attached to its stem, is forcibly placed in an operative position between the snap rolls.

Figure 1:
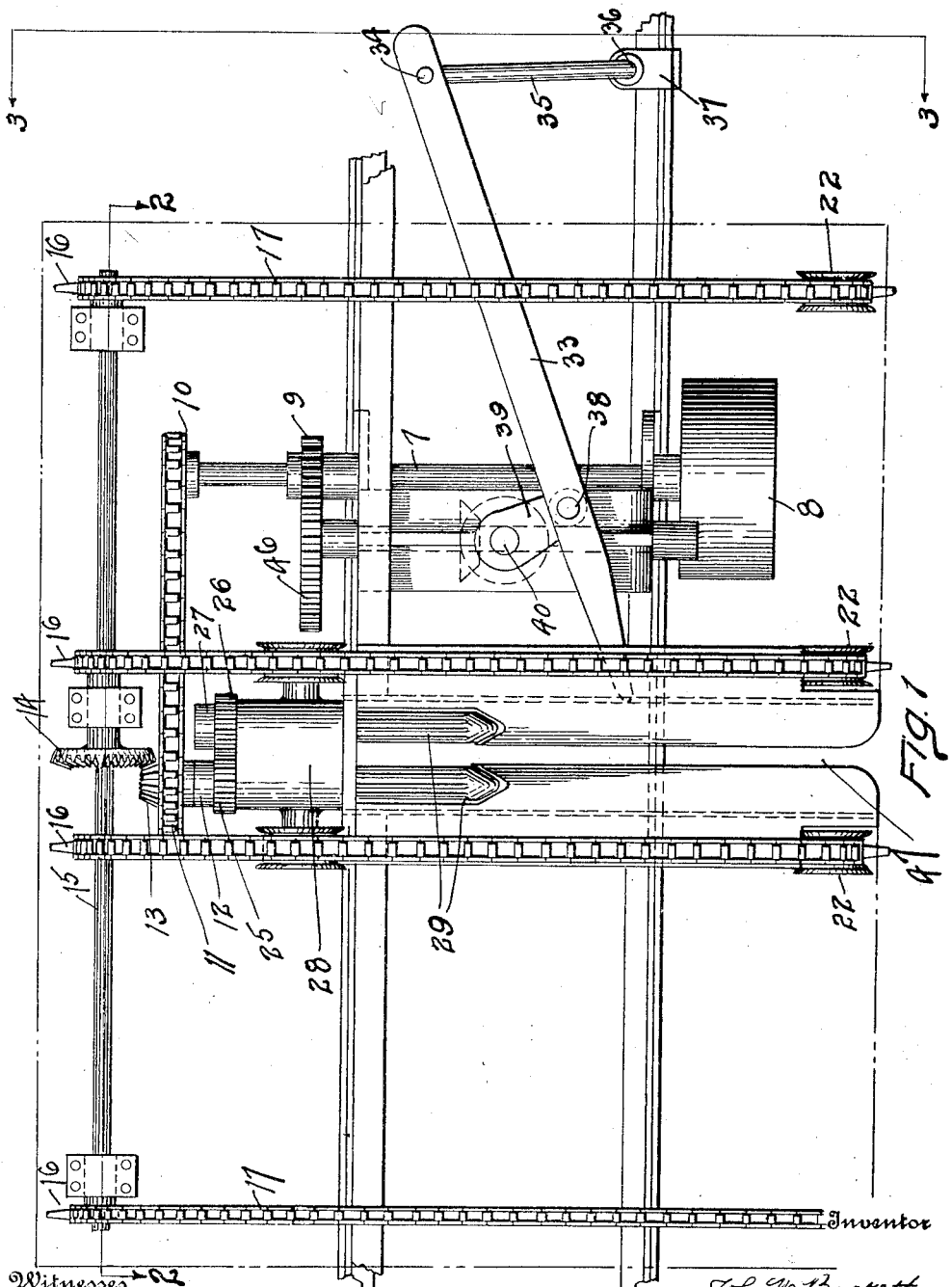
Figure 2:
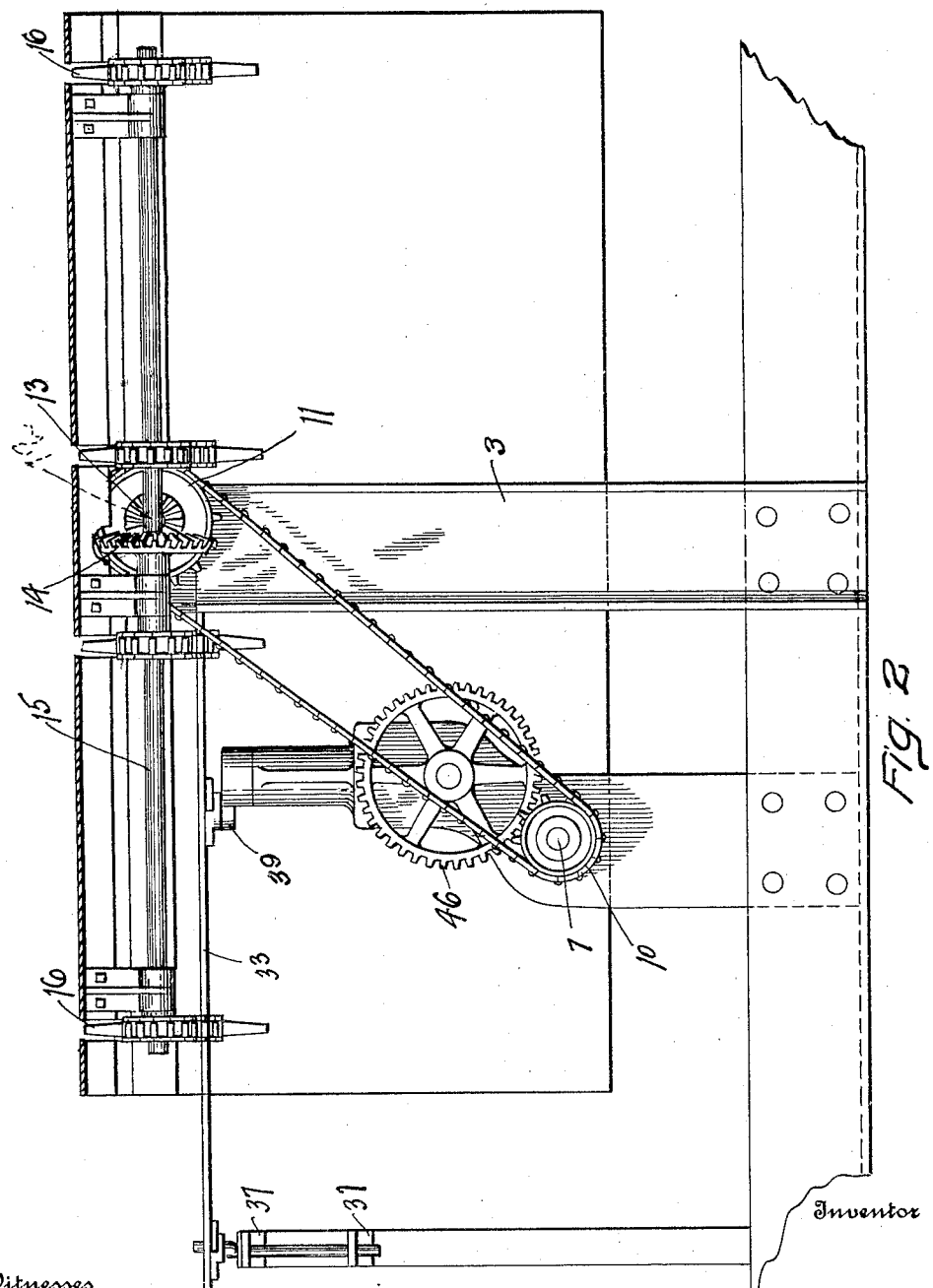
Figure 3:
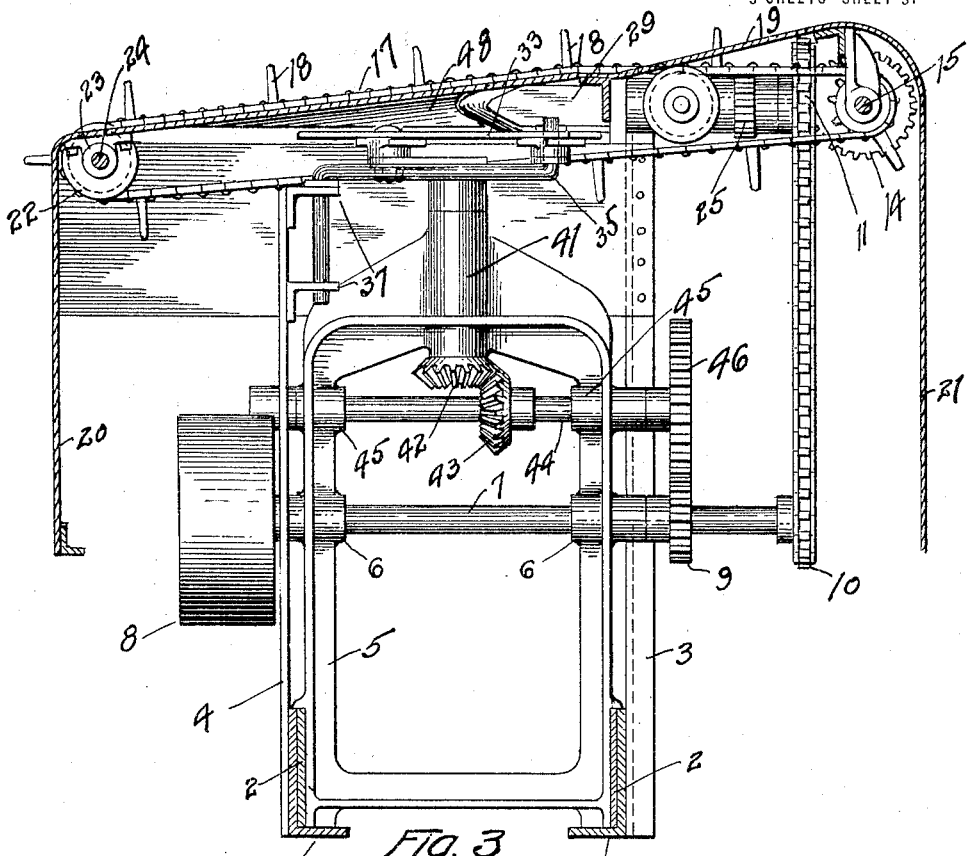
Figure 4:
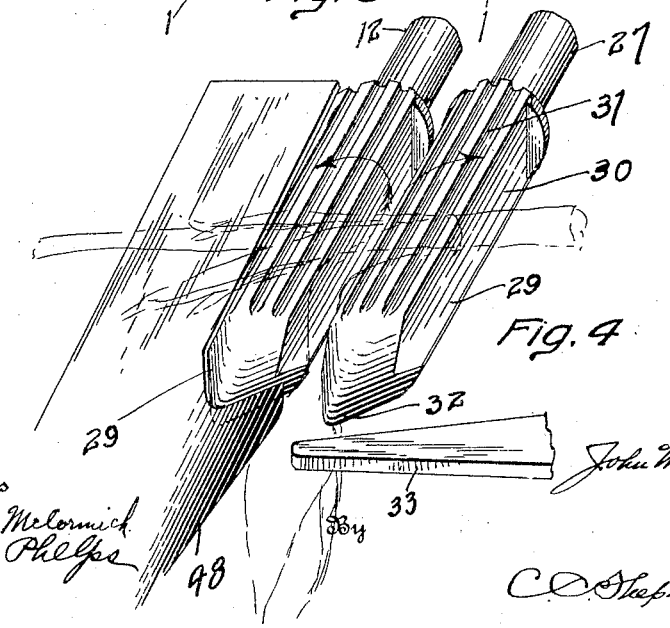

Other objects of my invention will become more apparent after a further detailed description of the accompanying sheets of drawings, in which similar characters of reference designate corresponding parts, and in which:

Figure 1 is a top plan view of the operating mechanism of my corn husker showing the covering table in dotted outline, Fig. 2 is a section taken on line 2—2 of Fig. 1 and looking in the direction of the arrows, Fig. 3 is a section taken on line 3—3 of Fig. 1 and looking in the direction of the arrows, and, Fig. 4 is a fragmentary view in perspective showing the feed rolls principally and showing an ear of corn with its husk and stalk in position between said rolls.

In the drawings, the husking mechanism has been shown separately from all conveying mechanism for the detached corn. As a result, the general framework formed by the angle irons 1 and coöperating plates 2, are only partially shown. This base structure also supports an upright channel member 3 and an upstanding plate member 4 between which is mounted a major supporting casting designated in its entirety by the numeral 5. This casting is formed with a pair of bearings 6 through which a shaft 7 passes, this shaft carrying a pulley 8 at one end to which power for driving the machine as a whole, may be applied and further carrying a gear 9 and sprocket wheel 10 at its opposite end. This sprocket wheel 10 is designed to also drive a sprocket wheel 11, this latter being mounted upon a shaft 12 which shaft also carries a bevel pinion 13. This bevel pinion 13 meshes with a bevel gear 14 mounted upon a shaft 15 and this shaft 15 carries a plurality of sprocket wheels 16 over which the conveyer chains 17 carrying upstanding flights 18 are designed to pass. The upper strand of these conveyer chains operate over the upper surface of a table structure designated in its entirety by the numeral 19, this table structure being shown in dotted outline in Fig. 1 and in section in Figs. 2 and 3, the depending portions 20 and 21 along each side being for the purpose of preventing the accidental entrance of the corn stalks into the operating parts of the machine. Sheaves 22 are mounted by means of bearings 23 and stub shafts 24 along the opposite edge of the table from that on which the shaft 15 is mounted, over which the conveyer chains 17 pass, these sheaves being the means of permitting the use of a series of endless conveyer chains as shown.

The shaft 12 previously referred to carries a spur gear 25 as shown particularly in Fig. 1, this gear meshing with a complemental gear 26 carried upon a shaft 27. These two shafts are rotatably journaled within a peculiarly shaped bearing member designated 28 and also carry snap rolls 29 on their opposite ends. These snap rolls are shown in detail in Fig. 4 from which it will be seen that at diametrically opposite points they are provided with flat places 30, while the remainder of their cylindrical surface is corrugated as shown at 31. Their extreme forward ends are tapered to cone shape as shown at 32 to permit the ready entrance within the same of an ear of corn. By means of the gear connection 25—26 these snap rolls are rotated and their initial mounting is such that the flat places 23 will lie directly opposite each other at intervals during their rotation.

In order that the ears of corn may be fed between the rolls beneath the table 19, as well as above the table 19, I have provided an oscillatory finger member designated 33. This finger member is pivotally mounted at 34 upon a crank arm 35 rotatably journaled as shown at 36 in outstanding bracket members 37, these bracket members being rigidly attached to the upper end of the plate 4. Intermediate its ends, or as shown at 38, this finger member is pivotally attached to a second crank designated 39. This latter crank is rigidly mounted upon the upper end of a shaft 40 rotatably journaled within the upper portion 41 of the casing 5. This shaft carries a bevel gear 42 on its lower end, which gear meshes with a complemental gear 43 rigidly carried upon a shaft 44, this shaft being also journaled in the framework of the casting 5 by means of the bearing formations shown at 45. One end of the shaft 44 carries a spur gear 46 which gear meshes with the spur pinion 9 referred to as being carried by the main drive shaft 7. Thus, continued rotation of the drive shaft 7 will rotate the shaft 40 carrying the crank 39 through the gear connections 46, 43 and 42. This rotation of the crank 39 maintains a continued oscillation of the finger member 33 toward and away from the snap rolls 29.

The mode of operation of my corn husker is as follows: The entire machine is set in operation by applying power to the pulley 8, which will impart motion to the conveyer chains 17. The upper strands of all the conveyer chains move toward the snap rolls 29 and it is upon these chains that the corn stalk is placed, care being taken that the ear of each stalk hangs into the slotted portion 47 of the table upon either side of which the snap rolls 29 are mounted. This table is flared downwardly slightly as shown at 48 in Figs. 3 and 4 to permit a ready sliding of the ear through the slot, motion being given the stalk by means of the upwardly extending flights 18. This depending ear is, therefore, conveyed within the range of movement of the continuously moving finger 33 and is finally engaged by this finger to be forced between the snap rolls 29. The timing of these rolls is such that the ear will be forced between them when the flat portions 30 lie directly opposite each other to provide an enlarged space. Continued rotation of the rolls then brings the corrugated portions 31 adjacent each other, with the result that the husker is pulled upwardly while the ear itself is prevented from entering the space between the rolls because of its greatly increased size. If sufficient pressure is exerted in this manner, the stem connecting the ear to the stalk will ultimately break, thus removing the ear from within its husk without in any manner mutilating or destroying either the husk or stalk. Continued movement of the conveyer chains will then discharge the stalk over the depending side of the table designated 21.

Thus it will appear that I have provided an extremely simple and at the same time efficient type of corn husker. This husker may be carried from one end of the flight to the other to husk the corn and then the stalk, etc., used for fodder and the like as may be desired.

What I claim, is:

1. In a corn husker, a table having a slot therein, conveyer chains movable over the top of said table for carrying the stalk forwardly at right angles to said slot, and a pair of snap rolls located beneath said table longitudinally on each side of said slot in a position to receive the ear stem between their ends.

2. In a corn husker, a pair of snap rolls supported to receive the ear stem between their ends, and means other than the rolls for holding the stem of said ear from without said rolls as said rolls are rotated.

3. In a corn husker, a table having a slot therein, and a pair of snap rolls located beneath said table and located longitudinally one on either side of said slot and supported to permit entrance of the ear stem between their ends.

4. In a corn husker, a pair of snap rolls each supported at their rear ends only, and means for rotating said rolls, each roll being formed with a flat face to present a space when said faces are opposite each other to receive the ear stem between their unsupported ends.

5. In a corn husker, a table having a slot therein, a pair of snap rolls supported at their rear ends only and located beneath said table longitudinally one on either side of said slot, each roll being formed with a flat face to present a space when said faces are opposite each other to receive the ear stem between their unsupported ends, and means for rotating said rolls.

6. In a corn husker, a table having a slot therein, a pair of snap rolls supported at their rear ends only and located beneath said table longitudinally one on either side of said slot, each roll being formed with a flat face to present a space when said faces are opposite each other to receive the ear stem from between their unsupported ends, means for rotating said rolls, and a conveyer structure operating to carry the corn stalk over the top of said table toward the ends of said rolls.

7. In a corn husker, a pair of snap rolls supported to permit the entrance of an ear stem between their ends, means for conveying a stalk of corn with its depending ear toward the ends of said rolls, and supplemental means for forcing the stem portion of said ear between said rolls from their ends.

8. In a corn husker, a pair of snap rolls each having a support at one end only, means for conveying a stalk of corn with its depending ear toward the ends of said rolls, and an oscillatory finger member for forcing the stem portion of said ear between the ends of said rolls.

9. In a corn husker, a pair of snap rolls supported to permit the entrance of an ear stem between their ends, an oscillatory finger member for forcing the stem portion of an ear between the ends of said rolls, and means for rotating said rolls up toward said stem and away from the ear.

10. In a corn husker, a pair of snap rolls supported to permit the entrance of an ear stem from between their ends and each provided with a flat face, an oscillatory finger member, and means whereby said member is timed to force the stem portion of an ear between the ends of said rolls when said flat portions are opposite each other during the continued rotation of said rolls.

11. In a corn husker, a table having a slot therein, conveyer chains running over the top of said table and located on each side of said slot, a pair of snap rolls located adjacent the underside of said table and spaced longitudinally on each side of said slot, each of said rolls being formed with a flat face supported to permit the entrance of an ear stem from between their ends, a movable finger member, and means for rotating said rolls and moving said finger in a manner so that the stem portion of an ear is forced between said rolls when said flat faces are opposite each other.

In testimony whereof I affix my signature in presence of two witnesses.

J. W. BURKETT.

Witnesses:
  C. B. HARDMAN,
  WALTER E. L. BOCK.